(12) United States Patent
Li et al.

(10) Patent No.: US 10,255,691 B2
(45) Date of Patent: Apr. 9, 2019

(54) METHOD AND SYSTEM OF DETECTING AND RECOGNIZING A VEHICLE LOGO BASED ON SELECTIVE SEARCH

(71) Applicants: SUN YAT-SEN UNIVERSITY, Guangzhou (CN); Guangdong Fundway Technology Co., Ltd., Guangzhou (CN)

(72) Inventors: Xiying Li, Guangzhou (CN); Shuo Lv, Guangzhou (CN); Qianyin Jiang, Guangzhou (CN); Donghua Luo, Guangzhou (CN); Minxian Yuan, Guangzhou (CN); Zhi Yu, Guangzhou (CN)

(73) Assignees: SUN YAT-SEN UNIVERSITY, Guangzhou (CN); Guangdong Fundway Technology Co., Ltd., Guangzhou (CN)

( * ) Notice: Subject to any disclaimer, the term of this patent is extended or adjusted under 35 U.S.C. 154(b) by 144 days.

(21) Appl. No.: 15/458,186

(22) Filed: Mar. 14, 2017

(65) Prior Publication Data
US 2018/0114337 A1    Apr. 26, 2018

(30) Foreign Application Priority Data

Oct. 20, 2016   (CN) .......................... 2016 1 0917735

(51) Int. Cl.
*G06K 9/00* (2006.01)
*G06T 7/73* (2017.01)
(Continued)

(52) U.S. Cl.
CPC ............ *G06T 7/73* (2017.01); *G06K 9/00791* (2013.01); *G06K 9/4604* (2013.01);
(Continued)

(58) Field of Classification Search
CPC ...... G02B 2027/014; G02B 2027/0138; G08G 1/166; G06K 9/629; G06K 9/4604; G06T 2207/30252; G06T 7/73
See application file for complete search history.

(56) References Cited

U.S. PATENT DOCUMENTS 9,373,036 B1 * 6/2016 Mei .................... G06K 9/00798
2008/0069400 A1 * 3/2008 Zhu ...................... G06K 9/3241
382/103
(Continued)

OTHER PUBLICATIONS

Wang, et al., A Fast Coarse-to-Fine Vehicle Logo Detection and Recognition Method, Proceedings of the 2007 IEEE International Conference on Robotics and Biomimetics, Dec. 15-18, 2007, pp. 691-696.*

(Continued)

*Primary Examiner* — Vu Le
*Assistant Examiner* — Guillermo M Rivera-Martinez
(74) *Attorney, Agent, or Firm* — Bond Schoeneck & King, PLLC; George McGuire; William Greener (57) ABSTRACT

The invention discloses a method and a system of detecting and recognizing a vehicle logo based on Selective Search, the method comprising: positioning a vehicle plate on an original image of a vehicle to obtain a vehicle plate position; coarsely positioning a vehicle logo on the original image to obtain a coarse positioning image of the vehicle logo; selecting vehicle logo candidate areas in the coarse positioning image; performing target positioning in the vehicle logo candidate areas with the Selective Search to obtain a set of target regions; training a vehicle logo location classifier with Spatial Pyramid Matching based on Sparse Coding (ScSPM) to determine the vehicle logo from the set of target regions to obtain a vehicle logo position; and training a multi-class vehicle logo recognition classifier with the (Continued)

ScSPM to conduct a specific type-recognition for the vehicle logo to obtain a vehicle logo recognition result.

11 Claims, 4 Drawing Sheets

(51) Int. Cl.
  *G06K 9/46* (2006.01)
  *G06K 9/62* (2006.01)
(52) U.S. Cl.
  CPC ......... *G06K 9/4628* (2013.01); *G06K 9/4676* (2013.01); *G06K 9/628* (2013.01); *G06K 9/6249* (2013.01); *G06T 2207/30252* (2013.01)

(56) References Cited

U.S. PATENT DOCUMENTS

| | | | |
|---|---|---|---|
| 2014/0056520 A1* | 2/2014 | Rodriguez Serrano | G06K 9/325 382/174 |
| 2014/0270491 A1* | 9/2014 | Lu | G06K 9/4642 382/159 |
| 2015/0235092 A1* | 8/2015 | Mei | G06K 9/00805 382/103 |
| 2015/0371109 A1* | 12/2015 | Vo | G06K 9/00785 382/105 |
| 2016/0188633 A1* | 6/2016 | Wang | G06F 17/30867 707/728 |
| 2016/0217319 A1* | 7/2016 | Bhanu | G06K 9/00288 |

OTHER PUBLICATIONS

Mao et al., Rapid vehicle logo region detection based on information theory, Computers and Electrical Engineering 39, 2013, pp. 863-872.*

Peng et al., Vehicle Classification Using Sparse Coding and Spatial Pyramid Matching, 2014 IEEE 17th International Conference on Intelligent Transportation Systems (ITSC), Oct. 8-11, 2014, pp. 259-263.*

Psyllos et al., Vehicle model recognition from frontal view image measurements, Computer Standards & Interfaces, 2010, pp. 142-151.*

* cited by examiner

METHOD AND SYSTEM OF DETECTING AND RECOGNIZING A VEHICLE LOGO BASED ON SELECTIVE SEARCH

TECHNICAL FIELD

The present invention relates to the field of image processing, and more particularly, to a method and system of detecting and recognizing a vehicle logo based on Selective Search.

BACKGROUND

A vehicle logo detecting system for vehicle is an important part of an intelligent transportation system. A vehicle logo is served as a unique mark of vehicle brand. A vehicle recognition system can be effectively assisted to match with the relative information of the vehicle if the vehicle logo is correctly recognized, which will be beneficial to determine the identity of the vehicle and improve a recognition rate of vehicle model. Vehicle recognition is widely applied in the field of intelligent transportation, such as vehicle model matching, vehicle information collection and false plate detection. Due to the difference in areas, shapes and textures of the vehicle logo in reality, varied background grids of the vehicle logo, and the difference in such features as the vehicle logo space position of the large vehicle and small vehicle, a traditional vehicle logo detecting method based on template matching is difficult to obtain a high detection success rate while consuming a large amount of time.

In recent years, vehicle logo detection problems have been extensively studied. The existing vehicle logo detection algorithms include: a vehicle logo detecting method based on Adaboost, a vehicle logo detecting method based on vehicle logo texture feature, a vehicle logo detecting method based on texture consistency, a vehicle logo detecting method based on vehicle logo background elimination, a vehicle logo detecting method based on template and a vehicle logo detecting method based on exhaustive search, and the like. According to the vehicle logo detecting method based on Adaboost, the Adaboost classifier is used to study the features of the vehicle logo and a sliding window is used to position and recognize the vehicle logo. This method can obtain a better vehicle logo detection result, but the time consumption is too long. The vehicle logo detecting method based on the texture feature of the vehicle feature comprises the steps of firstly coarsely positioning the vehicle logo using the license plate position, then accurately positioning the vehicle logo using the prior knowledge of the vehicle logo and the vehicle logo edge feature, and recognizing the vehicle logo positioning result using the training classifier of the support vector machine; while the method is difficult to accurately position the vehicle logo under the condition of the complicated vehicle logo background texture. The vehicle logo detecting method based on the texture consistency is used for distinguishing the vehicle logo texture feature from the vehicle logo background feature so as to accurately position the vehicle logo and recognize the vehicle logo. This method is applicable to the situation in which the vehicle logo is very different from the background texture feature. But in reality, the vehicle logo is difficult to distinguish from the background texture feature thereof. The vehicle logo detecting method based on vehicle logo background elimination comprises the steps of eliminating the vehicle logo background texture using a filtering algorithm so as to obtain the accurate vehicle logo positioning result, then describing the vehicle logo using SIFT and other feature descriptor and recognizing through the classifier. This method can greatly reduce the influence of the vehicle logo background on the vehicle logo positioning, but it is easy to eliminate the vehicle logo information and affects the vehicle logo positioning and recognizing result. The vehicle logo detecting method based on template matching comprises the step of positing the position and the recognition result of the vehicle logo by taking the vehicle logo as the template. This method is relatively affected by the vehicle logo background little, but the time consumption is too long. The vehicle logo detecting method based on exhaustive search comprises the steps of performing the exhaustive search on the target area using the sliding window, and judging the target for the vehicle logo using such HOG, SIFT and other descriptor to obtain the vehicle logo area and the vehicle logo type. This method is theoretically applicable to all models, but the sliding window is relatively slow, which greatly affects the practicability of the algorithm.

In conclusion, the current vehicle logo detection algorithms have the following shortcomings or deficiencies that:

1) the vehicle logo for small vehicle is mostly detected merely, so that it is unable to be applied to all models, and the applicability is not wide.

2) under the influence of illumination, inclination and complicated grid background of vehicle logo, the current algorithm is difficult to detect the vehicle logo accurately, and the robustness is weaker.

3) the consumption of time is long, the detection speed is slow, so that it is unable to meet the actual requirements of the high detection speed.

SUMMARY

In order to solve the above technical problems, an object of the invention is to provide a vehicle logo detecting and recognizing method based on Selective Search having wide applicability, strong robustness and fast detection speed.

Another object of the invention is to provide a vehicle logo detecting and recognizing system based on Selective Search having wide applicability, strong robustness and fast detection speed.

A technical solution adopted by the invention to achieve the method and system can be described as follows.

A method of detecting and recognizing vehicle logo based on Selective Search, comprising:

positioning a license plate on an original image of a vehicle to obtain a license plate position;

coarsely positioning a vehicle logo on the original image of the vehicle according to the license plate position, spatial structure between the license plate and the vehicle logo, and vehicle window edge feature, to obtain a coarse positioning image of the vehicle logo;

selecting vehicle logo candidate areas in the coarse positioning image of the vehicle logo based on a central axis of the vehicle;

performing target positioning in the vehicle logo candidate areas with Selective Search, to obtain a set of target regions, and performing region combination with the Selective Search based on Color similarity, Texture similarity, Size similarity and Fill similarity comprehensively;

training a vehicle logo location classifier with Spatial Pyramid Matching based on Sparse Coding (ScSPM), to determine the vehicle logo from the set of target regions, to obtain a vehicle logo position; and training a multi-class vehicle logo recognition classifier with the Spatial Pyramid Matching based on Sparse Coding (ScSPM) to conduct a specific type-recognition for the vehicle logo, to obtain a vehicle logo recognition result.

Further, the step of coarsely positioning a vehicle logo on the original image of the vehicle according to the license plate position, spatial structure between the license plate and the vehicle logo, and vehicle window edge feature, to obtain a coarse positioning image of the vehicle logo, comprises the following sub-steps of:

determining a position of a down boundary for vehicle logo coarse positioning according to a position of a up boundary for vehicle logo coarse positioning, the down boundary for vehicle logo coarse positioning having a coordinate $Y_{down}$ determined by a formula $Y_{down}=y_{up}$, wherein $y_{up}$ refers to a coordinate of the up boundary for vehicle logo coarse positioning;

coarsely positioning a vehicle window according to vertical projection of the original image of the vehicle to obtain the vehicle window edge feature, and determining a position of the up boundary for vehicle logo coarse positioning according to the vehicle window edge feature, the coordinate $Y_{up}$ of the up boundary for the vehicle logo coarse positioning being determined by a formula:

$$\begin{cases} Y_{up} = x_2 - (x_2 - x_1)/2 \\ x_1, x_2 = \max_2 h(x) \\ \text{s.t. } |x_1 - x_2| \in [H/4, H/2], x_1 \in (0, H/3], |h(x_1) - h(x_2)| \le b \end{cases},$$

wherein, h(x) refers to the vertical projection of the original image of the vehicle, $\max_2 h(x)$ denotes x-coordinates $x_1$ and $x_2$ corresponding to two maximum values $h(x_1)$ and $h(x_2)$ selected from the vertical projection h(x) of the edge from up to down, H refers to a height of the original image of the vehicle, and b refers to an experience threshold value; and obtaining the coarse positioning image of the vehicle logo according to the coordinate $Y_{down}$ of down boundary for vehicle logo coarse positioning and the coordinate $Y_{up}$ of the up boundary for vehicle logo coarse positioning.

Further, the step of selecting vehicle logo candidate areas in the coarse positioning image of the vehicle logo based on a central axis of vehicle, comprises the following sub-steps of:

determining the central axis of the vehicle on the coarse positioning image of the vehicle logo; and selecting an area having a set width and a set height as a first vehicle logo candidate area according to the central axis of the vehicle.

Further, the step of performing target positioning in the vehicle logo candidate areas with the Selective Search, to obtain a set of target regions, comprises the following sub-steps of:

S1. performing target detection in the first vehicle logo candidate area using the Selective Search, going to step S2 if failing to detect any target, otherwise, directly jumping to step S3;

S2. transversely amplifying the first vehicle logo candidate area with a transversely amplified width set to form a second vehicle logo candidate area, and then performing target detection for vehicle logo in the second vehicle logo candidate area using the Selective Search, if still failing to detect any target, abandoning the first vehicle logo candidate area and continuing to amplify the second vehicle logo candidate area with a new transversely amplified width, until a target is detected in the second vehicle logo candidate area, then going to step S3; otherwise, going to step S3; and S3. determine the target detected is a single character or a character string vehicle logo or a symbol type vehicle logo, ending the Selective Search if the target detected is the character string vehicle logo or the symbol type vehicle logo, taking 1.5 times of the character height as a height of the candidate region, i.e. a height of the third vehicle logo candidate area if the target detected is the single character, and continuing to perform target detection in the third vehicle logo candidate area using the Selective Search.

Further, the step of performing target positioning in the vehicle logo candidate areas with the Selective Search to obtain a set of target regions, comprises the following sub-steps of:

obtaining initial target regions from the vehicle logo candidate areas using an image segmentation algorithm based on a graph theory;

calculating comprehensive similarity between the adjacent regions in the initial target regions, via a calculation formula:

$$\begin{cases} s(r_i, r_j) = a_1 s_{color}(r_i, r_j) + a_2 s_{texture}(r_i, r_j) + a_3 s_{size}(r_i, r_j) + a_4 \text{fill}(r_i, r_j) \\ s_{color}(r_i, r_j) = \sum_{k=1}^{n} \min(c_i^k, c_j^k), c_i^k \in C_i = \{c_i^1, \ldots, c_i^n\}, c_j^k \in C_j = \{c_j^1, \ldots, c_j^n\} \\ s_{texture}(r_i, r_j) = \sum_{k=1}^{n} \min(t_i^k, t_j^k), t_i^k \in T_i = \{c_i^1, \ldots, c_i^n\}, t_j^k \in T_j = \{c_j^1, \ldots, c_j^n\} \\ s_{size}(r_i, r_j) = 1 - \frac{size(r_i) + size(r_j)}{size(im)} \\ \text{fill}(r_i, r_j) = 1 - \frac{size(BB_{ij}) - size(r_i) - size(r_j)}{size(im)} \end{cases};$$

wherein $s(r_i,r_j)$, $s_{color}(r_i,r_j)$, $s_{texture}(r_i,r_j)$, $s_{size}(r_i,r_j)$ and fill $(r_i,r_j)$ refer to comprehensive similarity, Color similarity, Texture similarity, Size similarity and Fill similarity respectively between a region $r_i$ and a region $r_j$, $a_1$, $a_2$, $a_3$ and $a_4$ refer to a Color similarity weighting coefficient, a Texture similarity weighting coefficient, a Size similarity weighting coefficient and a Fill similarity weighting coefficient respectively, the value range of $a_1$, $a_2$, $a_3$ and $a_4$ is within (0, 1), $C_i=\{c_i^1, \ldots, c_i^n\}$ and $C_j=\{c_j^1, \ldots, c_j^n\}$ refer to 3×25-dimensional color space vectors corresponding to the region $r_i$ and the region $r_j$ respectively, $T_i=\{t_i^1, \ldots, t_i^n\}$ and $T_j=\{t_j^1, \ldots, t_j^n\}$ refer to 8×3×10-dimensional texture vector corresponding to the region and the region respectively, n refers to the total number of elements of the color space vector or texture vector, and $size(r_i)$, $size(r_j)$, size(im) and size $(BB_{ij})$ refer to size of the region $r_i$, size of the region $r_j$, size of the whole image combined by all the regions, and size of a outer boundary rectangle of a region combined by the region $r_i$ and the region $r_j$, respectively; and taking the comprehensive similarity maximum as a combination principle, combining the initial target regions according to the comprehensive similarity calculated between the adjacent regions, to obtain the set of target regions.

Further, the step of training a vehicle logo location classifier with Spatial Pyramid Matching based on Sparse Coding (ScSPM), to determine the vehicle logo from the set of target regions, to obtain a vehicle logo position, comprises the following sub-steps of:

dividing sample images into positive samples and negative samples, wherein the positive samples comprises single character samples, and small-vehicle logo samples and large-vehicle logo samples in the sample set, and the negative sample are samples having intersection over union (IoU) less than 20% with the vehicle logo and randomly selected from the sample set in size;

taking the positive samples as training samples, and using the ScSPM to perform training iteratively until convergence, and finally to have the vehicle logo location classifier, wherein, in the iterative training process, after each training, the samples which are wrongly divided into the negative samples in the vehicle logo location classifier is added into the training samples to form a new training sample set, then the new training sample set is used for retraining; and determining the vehicle logo from the set of target regions according to the vehicle logo location classified trained, to obtain the position of the vehicle logo.

Further, the step of training a multi-class vehicle logo recognition classifier with the ScSPM to conduct a specific type-recognition for the vehicle logo, to obtain a vehicle logo recognition result, comprises the following sub-steps of:

taking single characters as vehicle logos, feeding the single characters of manually annotated vehicle logos and the character string vehicle logos into the ScSPM to perform training iteratively, and taking the wrongly-classified vehicle logos as hard examples and feeding them into the ScSPM for training until convergence, to obtain the multi-class vehicle logo recognition classifier; and performing specific type-recognition for the vehicle logo with the multi-class vehicle logo recognition classifier: if the vehicle logo recognition result of the current multi-class vehicle logo recognition classifier is letter logo or symbol, taking the vehicle logo recognition result of the current multi-class vehicle logo recognition classifier as the vehicle logo type of the vehicle; if the vehicle logo recognition result of the current multi-class vehicle logo recognition classifier is a single character, reselecting a third vehicle logo candidate area according to the single character and re-positioning the vehicle logo, and combining the characters obtained by positioning to form the character string, and finally taking the vehicle logo type of the character string as the vehicle logo recognition result.

The invention adopts another technical solution as follows: A system of detecting and recognizing a vehicle logo based on Selective Search, comprising:

a license plate positioning module, configured to position a license plate on an original image of a vehicle, to obtain a license plate position;

a vehicle logo coarsely positioning module, configured to coarsely position a vehicle logo on the original image of the vehicle according to the license plate position, spatial structure between the license plate and the vehicle logo, and vehicle window edge feature, to obtain a coarse positioning image of the vehicle logo;

a vehicle logo candidate area selecting module, configured to select vehicle logo candidate areas in the coarse positioning image of the vehicle logo based on a central axis of the vehicle;

a target positioning module, configured to perform target positioning in the vehicle logo candidate areas with the Selective Search, to obtain a set of target regions, and performing region combination with the Selective Search based on Color similarity, Texture similarity, Size similarity and Fill similarity comprehensively;

a vehicle logo determining module, configured to train a vehicle logo location classifier with the ScSPM, to determine the vehicle logo from the set of target regions, to obtain a vehicle logo position; and a vehicle logo type recognition module, configured to train a multi-class vehicle logo recognition classifier with the ScSPM to conduct a specific type-recognition for the vehicle logo, to obtain a vehicle logo recognition result.

Further, the vehicle logo coarse positioning module comprises:

a vehicle logo coarse positioning down boundary position determining unit, configured to determine a position of a down boundary for vehicle logo coarse positioning according to a position of a up boundary for vehicle logo coarse positioning, the down boundary for vehicle logo coarse positioning having a coordinate $Y_{down}$ determined by a formula $Y_{down}=y_{up}$, wherein $y_{up}$ refers to a coordinate of the up boundary for vehicle logo coarse positioning;

a vehicle logo coarse positioning up boundary position determining unit, configured to coarsely position a vehicle window according to vertical projection of the original image of the vehicle to gain the vehicle window edge feature, and determining a position of the up boundary for vehicle logo coarse positioning according to the vehicle window edge feature, the coordinate $Y_{up}$ of the up boundary for the vehicle logo coarse positioning being determined by a formula:

$$\begin{cases} Y_{up} = x_2 - (x_2 - x_1)/2 \\ x_1, x_2 = \max_2 h(x) \\ \text{s.t. } |x_1 - x_2| \in [H/4, H/2], x_1 \in (0, H/3], |h(x_1) - h(x_2)| \leq b \end{cases},$$

wherein, h(x) refers to the vertical projection of the original image of the vehicle, $\max_2 h(x)$ denotes x-coordinates $x_1$ and $x_2$ corresponding to two maximum values $h(x_1)$ and selected from the vertical projection h(x) of the edge from up to down, H refers to a height of the original image of the vehicle, and b refers to an experience threshold value; and a vehicle logo coarse positioning image obtaining unit, configured to obtain the coarse positioning image of the vehicle logo according to the coordinate $Y_{down}$ of down boundary for vehicle logo coarse positioning and the coordinate $Y_{up}$ of the up boundary for vehicle logo coarse positioning.

Further, the target positioning module comprises:

an image segmentation unit, configured to obtain initial target regions from the vehicle logo candidate areas using an image segmentation algorithm based on a graph theory; a similarity calculation unit, configured to calculate comprehensive similarity between the adjacent regions in the initial target regions, via a calculation formula:

$$\begin{cases} s(r_i, r_j) = a_1 s_{color}(r_i, r_j) + a_2 s_{texture}(r_i, r_j) + a_3 s_{size}(r_i, r_j) + a_4 \text{fill}(r_i, r_j) \\ s_{color}(r_i, r_j) = \\ \sum_{k=1}^{n} \min(c_i^k, c_j^k), c_i^k \in C_i = \{c_i^1, \dots, c_i^n\}, c_j^k \in C_j = \{c_j^1, \dots, c_j^n\} \\ s_{texture}(r_i, r_j) = \\ \sum_{k=1}^{n} \min(t_i^k, t_j^k), t_i^k \in T_i = \{c_i^1, \dots, c_i^n\}, t_j^k \in T_j = \{c_j^1, \dots, c_j^n\} \\ s_{size}(r_i, r_j) = 1 - \frac{\text{size}(r_i) + \text{size}(r_j)}{\text{size}(im)} \\ \text{fill}(r_i, r_j) = 1 - \frac{\text{size}(BB_{ij}) - \text{size}(r_i) - \text{size}(r_j)}{\text{size}(im)} \end{cases};$$

Wherein $s(r_i,r_j)$, $s_{color}(r_i,r_j)$, $s_{texture}(r_i,r_j)$, $s_{size}(r_i,r_j)$ and $\text{fill}(r_i,r_j)$ refer to comprehensive similarity, Color similarity, Texture similarity, Size similarity and Fill similarity respectively between a region and a region $r_i$ and a region $r_j$, $a_1$, $a_2$, $a_3$ and $a_4$ refer to a Color similarity weighting coefficient, a Texture similarity weighting coefficient, a Size similarity weighting coefficient and a Fill similarity weighting coefficient respectively, the value range of $a_1$, $a_2$, $a_3$ and $a_4$ is within (0, 1), $C_i=\{c_i^1, \dots, c_i^n\}$ and $C_j=\{c_j^1, \dots, c_j^n\}$ refer to 3×25-dimensional color space vectors corresponding to the region $r_i$ and the region $r_j$ respectively, $T_i=\{t_i^1, \dots, t_i^n\}$ and $T_j=\{t_j^1, \dots, t_j^n\}$ refer to 8×3×10-dimensional texture vector corresponding to the region $r_i$ and the region $r_j$ respectively, n refers to the total number of elements of the color space vector or texture vector, and $\text{size}(r_i)$, $\text{size}(r_j)$, $\text{size}(im)$ and $\text{size}(BB_{ij})$ refer to size of the region $r_i$, size of the region $r_j$, size of the whole image combined by all the regions, and size of a outer boundary rectangle of a region combined by the region $r_i$ and the region $r_j$, respectively; and a region combination unit, configured to combine the initial target regions according to the comprehensive similarity calculated between the adjacent regions to obtain the set of target regions, taking the comprehensive similarity maximum as a combination principle.

The method of the present invention has the following beneficial effects: firstly, coarsely positioning the vehicle logo according to the space structure between the license plate and the vehicle log and the vehicle window edge feature, obtaining the vehicle logo candidate area based on the central axis of the vehicle, then positioning the target using the Selective Search, and finally distinguishing, screening and recognizing the target by the Spatial Pyramid Matching based on Sparse Coding (ScSPM) to obtain the vehicle logo position and the vehicle logo recognition result, without the limitation of the vehicle model, both the large vehicles and the small vehicles being able to be subject to the vehicle logo detection and recognition, with wide application; using the Selective Search, comprehensively combining the region according to the Color similarity, Texture similarity, Size similarity and Fill similarity, being still able to correctly detecting the position of the vehicle logo by the texture, color, size and fitness features of the vehicle logo under the influence of illumination, inclination and complicated grid background of vehicle logo, with strong robustness; and selecting the vehicle logo candidate area according to the space position information of the vehicle and the central axis of the vehicle, greatly reducing the time-consumption of the Selective Search, and having a faster detection speed. Further, the Selective Search uses a Texture similarity calculating method based on a histogram of oriented gradients, and uses the histogram of oriented gradients to replace a scale invariant transform feature, which can greatly reduce the consumption of time while ensuring the vehicle logo positioning accuracy rate and recognition accuracy rate.

The system of the present invention has the advantageous effects: firstly, coarsely positioning the vehicle logo according to the space structure between the license plate and the vehicle log and the vehicle window edge feature in the vehicle logo coarse positioning module, obtaining the vehicle logo candidate area based on the central axis of the vehicle in the vehicle logo candidate area, then positioning the target using the Selective Search, and finally distinguishing in the target positioning module, screening and recognizing the target by the ScSPM to obtain the vehicle logo position and the vehicle logo recognition result in the vehicle logo judgment module and the vehicle logo type recognition module, without the limitation of the vehicle model, both the large vehicle and the small vehicle being able to be subject to the vehicle logo detection and recognition, with wide application; using the Selective Search in the target positioning module, comprehensively combining the region according to the Color similarity, Texture similarity, Size similarity and Fill similarity, being still able to correctly detecting the position of the vehicle logo by the texture, color, size and fitness features of the vehicle logo under the influence of illumination, inclination and complicated grid background of vehicle logo, with strong robustness; and selecting the vehicle logo candidate area according to the space position information of the vehicle and the central axis of the vehicle in the vehicle logo coarse positioning module and the vehicle logo candidate area, greatly reducing the time-consumption of the Selective Search, and having a faster detection speed. Further, the Selective Search of the target positioning module uses a Texture similarity calculating method based on a histogram of oriented gradients, and uses the histogram of oriented gradients to replace a scale invariant transform feature, which can greatly reduce the consumption of time while ensuring the vehicle logo positioning accuracy rate and recognition accuracy rate.

DETAILED DESCRIPTION

Figure 1:
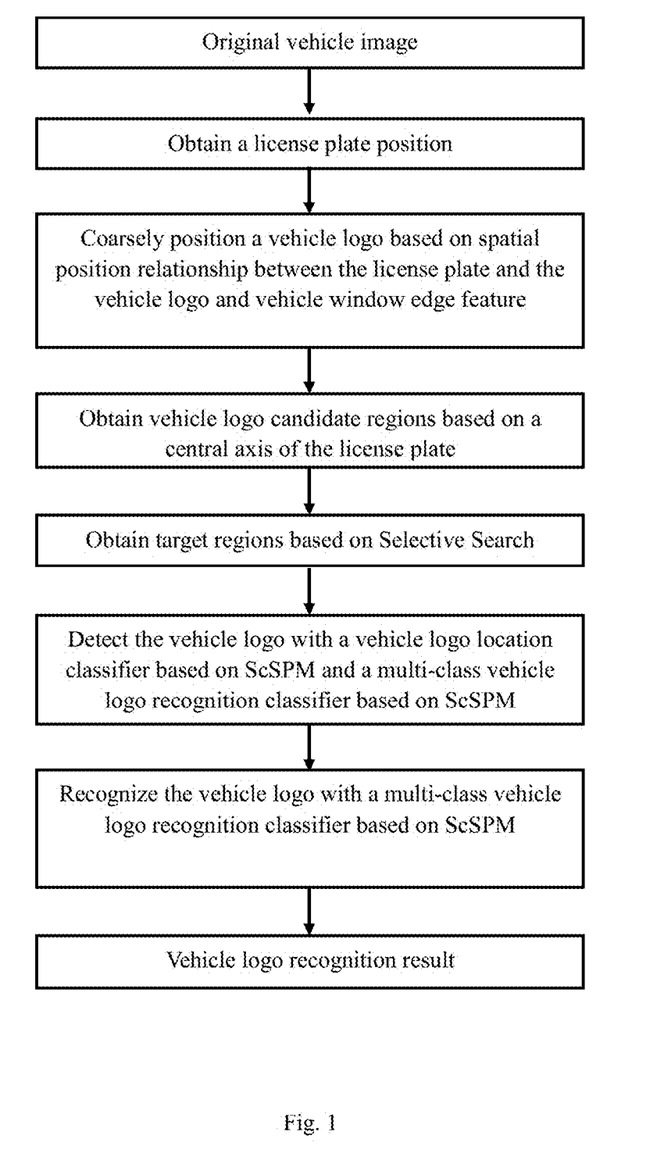
FIG. 1 is an overall flow chart of a method of detecting and recognizing a vehicle logo based on Selective Search according to the invention.

Referring to FIG. 1, a method of detecting and recognizing a vehicle logo based on Selective Search according to the invention comprises the following steps of:

A method of detecting and recognizing a vehicle logo based on Selective Search, comprising:

positioning a license plate on an original image of a vehicle to obtain a license plate position;

coarsely positioning a vehicle logo on the original image of the vehicle according to the license plate position, spatial structure between the license plate and the vehicle logo, and vehicle window edge feature, to obtain a coarse positioning image of the vehicle logo;

selecting vehicle logo candidate areas in the coarse positioning image of the vehicle logo based on a central axis of the vehicle;

performing target positioning in the vehicle logo candidate areas with the Selective Search, to obtain a set of target regions, and performing region combination with the Selective Search based on Color similarity, Texture similarity, Size similarity and Fill similarity comprehensively;

training a vehicle logo location classifier with Spatial Pyramid Matching based on Sparse Coding (ScSPM), to determine the vehicle logo from the set of target regions, to obtain a vehicle logo position; and training a multi-class vehicle logo recognition classifier with the ScSPM to conduct a specific type-recognition for the vehicle logo, to obtain a vehicle logo recognition result.

Further, as a preferred embodiment, the step of coarsely positioning a vehicle logo on the original image of the vehicle according to the license plate position, spatial structure between the license plate and the vehicle logo, and vehicle window edge feature, to obtain a coarse positioning image of the vehicle logo, comprises the following sub-steps of determining a position of a down boundary for vehicle logo coarse positioning according to a position of a up boundary for vehicle logo coarse positioning, the down boundary for vehicle logo coarse positioning having a coordinate $Y_{down}$ determined by a formula $Y_{down} = y_{up}$, wherein $y_{up}$ refers to a coordinate of the up boundary for vehicle logo coarse positioning;

coarsely positioning a vehicle window according to vertical projection of the original image of the vehicle to gain the vehicle window edge feature, and determining a position of the up boundary for vehicle logo coarse positioning according to the vehicle window edge feature, the coordinate $Y_{up}$ of the up boundary for the vehicle logo coarse positioning being determined by a formula:

$$\begin{cases} Y_{up} = x_2 - (x_2 - x_1)/2 \\ x_1, x_2 = \max_2 h(x) \\ \text{s.t. } |x_1 - x_2| \in [H/4, H/2], x_1 \in (0, H/3], |h(x_1) - h(x_2)| \le b \end{cases},$$

wherein, $h(x)$ refers to the vertical projection of the original image of the vehicle, $\max_2 h(x)$ denotes x-coordinates $x_1$ and $x_2$ corresponding to two maximum values $h(x_1)$ and $h(x_2)$ selected from the vertical projection $h(x)$ of the edge from up to down, H refers to a height of the original image of the vehicle, and b refers to an experience threshold value; and obtaining the coarse positioning image of the vehicle logo according to the coordinate $Y_{down}$ of down boundary for vehicle logo coarse positioning and the coordinate $Y_{up}$ of the up boundary for vehicle logo coarse positioning.

Further, as a preferred embodiment, the step of selecting vehicle logo candidate areas in the coarse positioning image of the vehicle logo based on a central axis of vehicle, comprises the following sub-steps of:

determining the central axis of the vehicle on the coarse positioning image of the vehicle logo; and selecting an area having a set width and a set height as a first vehicle logo candidate area according to the central axis of the vehicle.

Further, as a preferred embodiment, the step of performing target positioning in the vehicle logo candidate areas with the Selective Search, to obtain a set of target regions, comprises the following sub-steps of:

S1. performing target detection in the first vehicle logo candidate area using the Selective Search, going to step S2 if falling to detect any target, otherwise, directly jumping to step S3;

S2. transversely amplifying the first vehicle logo candidate area with a transversely amplified width set to form a second vehicle logo candidate area, and then performing target detection for vehicle logo in the second vehicle logo candidate area using the Selective Search, if still failing to detect any target, abandoning the first vehicle logo candidate area and continuing to amplify the second vehicle logo candidate area with a new transversely amplified width, until a target is detected in the second vehicle logo candidate area, then going to step S3; otherwise, going to step S3; and S3. determine the target detected is a single character or a character string vehicle logo or a symbol type vehicle logo, ending the Selective Search if the target detected is the character string vehicle logo or the symbol type vehicle logo, taking 1.5 times of the character height as a height of the candidate region, i.e. a height of the third vehicle logo candidate area if the target detected is the single character, and continuing to perform target detection in the third vehicle logo candidate area using the Selective Search.

Further, as a preferred embodiment, the step of performing target positioning in the vehicle logo candidate areas with the Selective Search to obtain a set of target regions, comprises the following sub-steps of:

obtaining initial target regions from the vehicle logo candidate areas using an image segmentation algorithm based on a graph theory;

calculating comprehensive similarity between the adjacent regions in the initial target regions, via a calculation formula:

$$\begin{cases} s(r_i, r_j) = \\ a_1 s_{color}(r_i, r_j) + a_2 s_{texture}(r_i, r_j) + a_3 s_{size}(r_i, r_j) + a_4 \text{fill}(r_i, r_j) \\ s_{color}(r_i, r_j) = \\ \sum_{k=1}^{n} \min(c_i^k, c_j^k), c_i^k \in C_i = \{c_i^1, \ldots, c_i^n\}, c_j^k \in C_j = \{c_j^1, \ldots, c_j^n\} \\ s_{texture}(r_i, r_j) = \\ \sum_{k=1}^{n} \min(t_i^k, t_j^k), t_i^k \in T_i = \{c_i^1, \ldots, c_i^n\}, t_j^k \in T_j = \{c_j^1, \ldots, c_j^n\} \\ s_{size}(r_i, r_j) = 1 - \frac{\text{size}(r_i) + \text{size}(r_j)}{\text{size}(im)} \\ \text{fill}(r_i, r_j) = 1 - \frac{\text{size}(BB_{ij}) - \text{size}(r_i) - \text{size}(r_j)}{\text{size}(im)} \end{cases} ;$$

wherein $s(r_i,r_j)$, $s_{color}(r_i,r_j)$, $s_{texture}(r_i,r_j)$, $s_{size}(r_i,r_j)$ and fill $(r_i,r_j)$ refer to comprehensive similarity, Color similarity, Texture similarity, Size similarity and Fill similarity respectively between a region $r_i$ and a region $r_j$, $a_1$, $a_2$, $a_3$ and $a_4$ refer to a Color similarity weighting coefficient, a Texture similarity weighting coefficient, a Size similarity weighting coefficient and a Fill similarity weighting coefficient respectively, the value range of $a_1$, $a_2$, $a_3$ and $a_4$ is within (0, 1), $C_i=\{c_i^1, \ldots, c_i^n\}$ and $C_j=\{c_j^1, \ldots, c_j^n\}$ refer to 3×25-dimensional color space vectors corresponding to the region $r_i$ and the region $r_j$ respectively, $T_i=\{t_i^1, \ldots, t_i^n\}$ and $T_j=\{t_j^1, \ldots, t_j^n\}$ refer to 8×3×10-dimensional texture vector corresponding to the region $r_i$ and the region $r_j$ respectively, n refers to the total number of elements of the color space vector or texture vector, and size($r_i$), size($r_j$), size(im) and size ($BB_{ij}$) refer to size of the region $r_i$, size of the region $r_j$, size of the whole image combined by all the regions, and size of a outer boundary rectangle of a region combined by the region $r_i$ and the region $r_j$, respectively; and taking the comprehensive similarity maximum as a combination principle, combining the initial target regions according to the comprehensive similarity calculated between the adjacent regions, to obtain the set of target regions.

Further, as a preferred embodiment, the step of training a vehicle logo location classifier with ScSPM, to determine the vehicle logo from the set of target regions, to obtain a vehicle logo position, comprises the following sub-steps of:

dividing sample images into positive samples and negative samples, wherein the positive samples comprises single character samples, and small-vehicle logo samples and large-vehicle logo samples in the sample set, and the negative sample are samples having intersection over union (IoU) less than 20% with the vehicle logo and randomly selected from the sample set in size;

taking the positive samples as training samples, and using the ScSPM to perform training iteratively until convergence, and finally to have the vehicle logo location classifier, wherein, in the iterative training process, after each training, the samples which are wrongly divided into the negative samples in the vehicle logo location classifier is added into the training samples to form a new training sample set, then the new training sample set is used for retraining; and determining the vehicle logo from the set of target regions according to the vehicle logo location classified trained, to obtain the position of the vehicle logo.

Further, as a preferred embodiment, the step of training a multi-class vehicle logo recognition classifier with the ScSPM to conduct a specific type-recognition for the vehicle logo, to obtain a vehicle logo recognition result, comprises the following sub-steps of:

taking single characters as vehicle logos, feeding the single characters of manually annotated vehicle logos and the character string vehicle logos into the ScSPM to perform training iteratively, and taking the wrongly-classified vehicle logos as hard examples and feeding them into the ScSPM for training until convergence, to obtain the multi-class vehicle logo recognition classifier; and performing specific type-recognition for the vehicle logo with the multi-class vehicle logo recognition classifier: if the vehicle logo recognition result of the current multi-class vehicle logo recognition classifier is letter logo or symbol, taking the vehicle logo recognition result of the current multi-class vehicle logo recognition classifier as the vehicle logo type of the vehicle; if the vehicle logo recognition result of the current multi-class vehicle logo recognition classifier is a single character, reselecting a third vehicle logo candidate area according to the single character and re-positioning the vehicle logo, and combining the characters obtained by positioning to form the character string, and finally taking the vehicle logo type of the character string as the vehicle logo recognition result.

Referring to FIG. 1 again, a system of detecting and recognizing a vehicle logo based on Selective Search, comprises:

a license plate positioning module, configured to position a license plate on an original image of a vehicle, to obtain a license plate position;

a vehicle logo coarsely positioning module, configured to coarsely position a vehicle logo on the original image of the vehicle according to the license plate position, spatial structure between the license plate and the vehicle logo, and vehicle window edge feature, to obtain a coarse positioning image of the vehicle logo;

a vehicle logo candidate area selecting module, configured to select vehicle logo candidate areas in the coarse positioning image of the vehicle logo based on a central axis of the vehicle;

a target positioning module, configured to perform target positioning in the vehicle logo candidate areas with the Selective Search, to obtain a set of target regions, and performing region combination with the Selective Search based on Color similarity, Texture similarity, Size similarity and Fill similarity comprehensively;

a vehicle logo determining module, configured to train a vehicle logo location classifier with Spatial Pyramid Matching based on Sparse Coding (ScSPM), to determine the vehicle logo from the set of target regions, to obtain a vehicle logo position; and a vehicle logo type recognition module, configured to train a multi-class vehicle logo recognition classifier with the ScSPM to conduct a specific type-recognition for the vehicle logo, to obtain a vehicle logo recognition result.

Further, as a preferred embodiment, the vehicle logo coarse positioning module comprises:

a vehicle logo coarse positioning down boundary position determining unit, configured to determine a position of a down boundary for vehicle logo coarse positioning according to a position of a up boundary for vehicle logo coarse positioning, the down boundary for vehicle logo coarse positioning having a coordinate $Y_{down}$ determined by a formula $Y_{down}=y_{up}$, wherein $y_{up}$ refers to a coordinate of the up boundary for vehicle logo coarse positioning;

a vehicle logo coarse positioning up boundary position determining unit, configured to coarsely position a vehicle window according to vertical projection of the original image of the vehicle to gain the vehicle window edge feature, and determining a position of the up boundary for vehicle logo coarse positioning according to the vehicle window edge feature, the coordinate $Y_{up}$ of the up boundary for the vehicle logo coarse positioning being determined by a formula:

$$\begin{cases} Y_{up} = x_2 - (x_2 - x_1)/2 \\ x_1, x_2 = \max_2 h(x) \\ \text{s.t. } |x_1 - x_2| \in [H/4, H/2], x_1 \in (0, H/3], |h(x_1) - h(x_2)| \le b \end{cases},$$

wherein, $h(x)$ refers to the vertical projection of the original image of the vehicle, $\max_2 h(x)$ denotes x-coordinates $x_1$ and $x_2$ corresponding to two maximum values $h(x_1)$ and $h(x_2)$ selected from the vertical projection $h(x)$ of the edge from up to down, H refers to a height of the original image of the vehicle, and b refers to an experience threshold value; and a vehicle logo coarse positioning image obtaining unit, configured to obtain the coarse positioning image of the vehicle logo according to the coordinate $Y_{down}$ of down boundary for vehicle logo coarse positioning and the coordinate $Y_{up}$ of the up boundary for vehicle logo coarse positioning.

Further, as a preferred embodiment, the target positioning module comprises:

an image segmentation unit, configured to obtain initial target regions from the vehicle logo candidate areas using an image segmentation algorithm based on a graph theory;

a similarity calculation unit, configured to calculate comprehensive similarity between the adjacent regions in the initial target regions, via a calculation formula:

$$\begin{cases} s(r_i, r_j) = \\ a_1 s_{color}(r_i, r_j) + a_2 s_{texture}(r_i, r_j) + a_3 s_{size}(r_i, r_j) + a_4 \text{fill}(r_i, r_j) \\ s_{color}(r_i, r_j) = \\ \sum_{k=1}^{n} \min(c_i^k, c_j^k), c_i^k \in C_i = \{c_i^1, \dots, c_i^n\}, c_j^k \in C_j = \{c_j^1, \dots, c_j^n\} \\ s_{texture}(r_i, r_j) = \\ \sum_{k=1}^{n} \min(t_i^k, t_j^k), t_i^k \in T_i = \{c_i^1, \dots, c_i^n\}, t_j^k \in T_j = \{c_j^1, \dots, c_j^n\} \\ s_{size}(r_i, r_j) = 1 - \dfrac{\text{size}(r_i) + \text{size}(r_j)}{\text{size}(im)} \\ \text{fill}(r_i, r_j) = 1 - \dfrac{\text{size}(BB_{ij}) - \text{size}(r_i) - \text{size}(r_j)}{\text{size}(im)} \end{cases};$$

Wherein $s(r_i, r_j)$, $s_{color}(r_i, r_j)$, $s_{texture}(r_i, r_j)$, $s_{size}(r_i, r_j)$ and $\text{fill}(r_i, r_j)$ refer to comprehensive similarity, Color similarity, Texture similarity, Size similarity and Fill similarity respectively between a region $r_i$ and a region $r_j$, $a_1$, $a_2$, $a_3$ and $a_4$ refer to a Color similarity weighting coefficient, a Texture similarity weighting coefficient, a Size similarity weighting coefficient and a Fill similarity weighting coefficient respectively, the value range of $a_1$, $a_2$, $a_3$ and $a_4$ is within (0, 1), $C_i=\{c_i^1, \dots, c_i^n\}$ and $C_j\{c_j^1, \dots, c_j^n\}$ refer to 3×25-dimensional color space vectors corresponding to the region $r_i$ and the region $r_j$ respectively, $T_i=\{t_i^1, \dots, t_i^n\}$ and $T_j=\{t_j^1, \dots, t_j^n\}$ refer to 8×3×10-dimensional texture vector corresponding to the region $r_i$ and the region $r_j$ respectively, n refers to the total number of elements of the color space vector or texture vector, and size($r_i$), size($r_j$), size(im) and size($BB_{ij}$) refer to size of the region $r_i$, size of the region $r_j$, size of the whole image combined by all the regions, and size of a outer boundary rectangle of a region combined by the region and the region, respectively; and a region combination unit, configured to combine the initial target regions according to the comprehensive similarity calculated between the adjacent regions to obtain the set of target regions, taking the comprehensive similarity maximum as a combination principle.

The invention will be further described in detail hereinafter with reference to the drawings and specific embodiments of the description.

Embodiment I

Figure 2A:
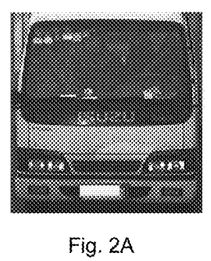
FIG. 2A is a schematic diagram of a first type of vehicle logo of a large vehicle.
Figure 2B:
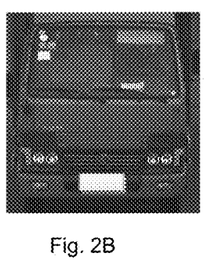
FIG. 2B is a schematic diagram of a second type of vehicle logo of a large vehicle.
Figure 2C:
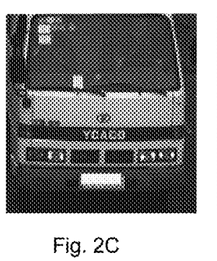
FIG. 2C is a schematic diagram of a third type of vehicle logo of a large vehicle.
Figure 2D:
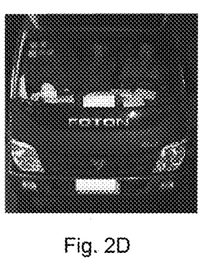
FIG. 2D is a schematic diagram of a fourth type of vehicle logo of a large vehicle.

The vehicles in type can be roughly divided into the large vehicles and small vehicles. The vehicle logos of the small vehicle are usually a symbol type vehicle logo, but the vehicle logos of the large vehicles can be divided into three types according to the texture of the vehicle logo, including a character type vehicle logo, a symbol type vehicle logo and a mixed type vehicle logo, as shown in FIGS. 2A-2D, wherein FIG. 2A shows the character type vehicle logo, FIG. 2B shows the symbol type vehicle logo, FIG. 2C and FIG. 2D show the mixed type vehicle logo. Both the spatial structure and texture feature of the vehicle logos of the two types of vehicles are different. These factors increase the difficulty in detection of vehicle logo.

To address the problem that the existing vehicle logo detecting and recognizing method has narrow applicability, weak robustness and slow detection speed, the present invention proposes a brand-new vehicle logo detection and recognition method based on Selective Search, which is applicable for all vehicle models in vehicle logo detection. In order to ensure real-time capability of vehicle logo positioning and effectiveness of vehicle logo positioning under a complicated background of vehicle logo, in the invention firstly the spatial relationship between the license plate and the vehicle logo, and the vehicle window edge feature are utilized to coarsely position the vehicle logo. In addition, in order to reduce the amount of calculations, in the invention the central axis of the vehicle is utilized to obtain the vehicle logo candidate area. Moreover, the Selective Search is utilized to perform target positioning and the ScSPM is used to perform target screening. Finally, the position of the vehicle logo and the vehicle logo recognition result are obtained in a way of non-maximum suppression (namely convergence).

As shown in FIG. 1, a method of detecting and recognizing a vehicle logo based on Selective Search according to the invention has the specific process as follows.

(I) A license plate is positioned on an original vehicle image, to obtain a position of the license plate.

After the original vehicle image is captured, the position of the license plate can be obtained by using an existing license plate positioning method.

(II) The vehicle logo is coarsely positioned according to the position of the license plate, the spatial structure between the license plate and the vehicle logo, and the vehicle window edge feature in the original vehicle image, to obtain a coarse positioning image of the vehicle logo.

There is extremely important spatial structure among the vehicle logo, the license plate and the vehicle window: the vehicle logo is located above the license plate, and the vehicle logo is located below the vehicle window. Under the condition of failing to determine the accuracy of the position information of the license plate, according to the invention the coarse positioning position information of the license plate and the vehicle window edge feature are used to obtain the coarse positioning position of the vehicle logo.

(1) A position of a down boundary of vehicle logo coarse positioning is determined according to a position of an up boundary of vehicle logo coarse positioning.

$$Y_{down=yup} \quad (1)$$

wherein, $Y_{down}$ denotes a coordinate of the down boundary of vehicle logo coarse positioning, and $y_{up}$ denotes a coordinate of the up boundary of license plate coarse positioning.

(2) The position of the up boundary of vehicle logo coarse positioning is determined by the vehicle window edge feature.

Edge and spatial position features of the vehicle window are obvious: the boundary edge of the vehicle window is complicated but the interior edge of it is relatively smooth, and the vehicle window is located at an uppermost portion of the front of the vehicle. Therefore, the vehicle window can be coarsely positioned by the vertical projection of the vehicle.

$$x_1, x_2 = \max_2 h(x)$$

$$s.t. |x_1-x_2| \in [H/4, H/2], x_1 \in (0, H/3), |h(x_1)-h(x_2)| \leq b \quad (2)$$

wherein, h(x) denotes the vertical projection of a vehicle edge image, $\max_2$ h(x) denotes x-coordinates $x_1$ and $x_2$ corresponding to two maximum values selected from the vertical projection of the edge from up to down, H denotes a height of the original vehicle image, and b refers to an experience threshold value.

The coordinate $Y_{up}$ of the up boundary of vehicle logo coarse positioning is:

$$Y_{up} = x_2 - (x_2 - x_1)/2 \quad (3)$$

Figure 3A:
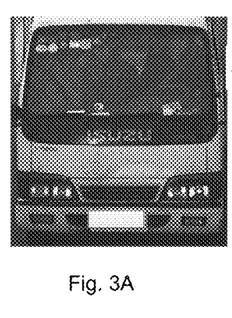
FIG. 3A is a schematic diagram of a coarse positioning process of the vehicle logo according to the invention.
Figure 3B:
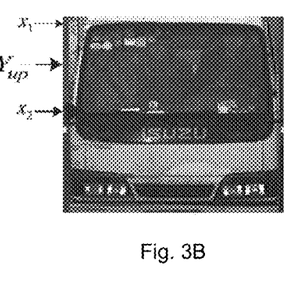
FIG. 3B is an additional schematic diagram of a coarse positioning process of the vehicle logo according to the invention.
Figure 3C:
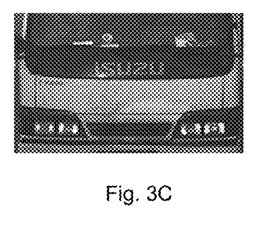
FIG. 3C is another schematic diagram of a coarse positioning process of the vehicle logo according to the invention.

(3) The vehicle logo coarse positioning image can be obtained according to formulas (1), (2) and (3), as shown in FIGS. 3A-3B, wherein, FIG. 3A is the original vehicle image, FIG. 3B is the vehicle logo coarse positioning image based on the position of the license plate, and FIG. 3C is a final vehicle logo coarse positioning image.

(III) A vehicle logo candidate area is selected from the vehicle logo coarse positioning image based on a central axis of vehicle.

Figure 4A:
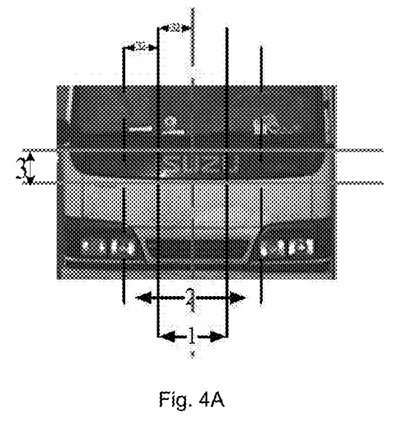
FIG. 4A is a schematic diagram of a designating process of a vehicle logo candidate area according to the invention.
Figure 4B:
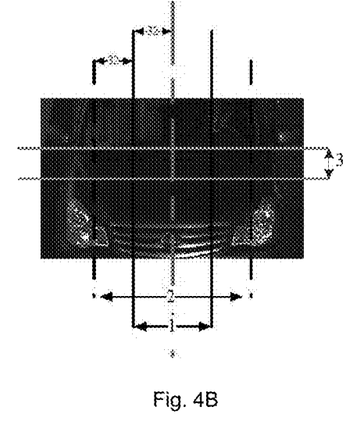
FIG. 4B is an additional schematic diagram of a designating process of a vehicle logo candidate area according to the invention.

Time consumption of the Selective Search is linearly related to the number of region pixels. Therefore, in order to reduce the time consumption, according to the invention, vehicle logo positioning area is reduced as much as possible while the integrity of the vehicle logo is ensured. The vehicle logo candidate area is obtained according to the central axis of the vehicle in the invention, as shown in FIGS. 4A-4B, wherein, FIG. 4A is a schematic diagram of classifying the vehicle logo candidate area of the vehicle logo of a large vehicle, and FIG. 4B is a schematic diagram of classifying the vehicle logo candidate of the vehicle logo of a small vehicle.

A first vehicle logo candidate area 1 is selected by means of the central axis of the vehicle, and a width and a height of the first vehicle logo candidate area can be set according to the actual conditions. The width of the first vehicle logo candidate area 1 in the embodiment is set as 64 pixels, and the height thereof is identical to the height of the vehicle logo coarse positioning image. When in the first vehicle logo candidate area 1 a single character is detected, 1.5 times of the height of the character is taken as a height of a new candidate region (namely vehicle logo candidate area 3) and detection for the vehicle logo is continued; when a character string vehicle logo or a symbol type vehicle logo is detected, the calculation of the Selective Search is finished; when no target is detected, the candidate region is transversely amplified (32 pixels amplified leftward and rightward, respectively) to form a second vehicle logo candidate area 2, and the detection for the vehicle logo is continued, if still no target is detected, the first vehicle logo candidate area 1 is abandoned, and the second vehicle logo candidate area 2 is continuously amplified outward for vehicle logo detection. The time consumption of the Selective Search is greatly reduced by the candidate region selecting mechanism.

(IV) Target positioning on the vehicle logo candidate area is performed with the Selective Search to obtain the set of target regions.

Figure 5:
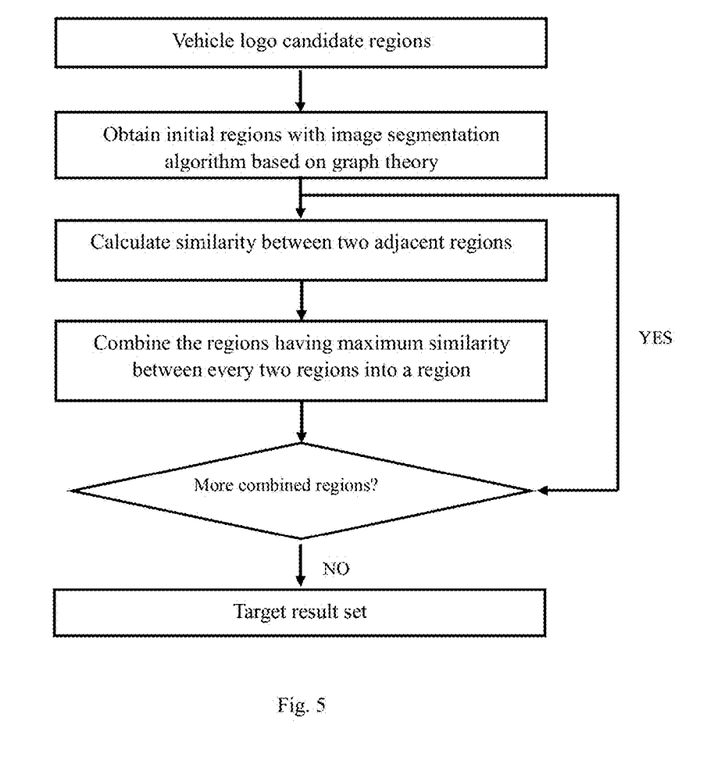
FIG. 5 is a flow chart of target positioning for the vehicle logo candidate area using the Selective Search according to the invention.

The Selective Search is an algorithm based on region combination, its calculation time is linearly related to the number of the pixel dots in the detection region, and its target area is obtained through combination of similar regions. Original segmentation regions are obtained by using an image segmentation algorithm based on figures, e.g., histogram of oriented gradients, in the present invention, similarity between two adjacent regions is calculated, the two regions having the maximum similarity are combined into one region, and the similarity between two adjacent regions are recalculated until an entire image (namely the target result set) is finally combined. The flow chart of the Selective Search is as shown in FIG. 5.

The similarity of the adjacent regions is calculated by the Selective Search in terms of color, texture, size and fitness, in the invention.

(1) Color Similarity

The imaged is normalized, and a histogram of 25 regions of each color channel of the image, i.e. a 3*25-dimensional color space vector $C_i = \{c_i^1, \ldots, c_i^n\}$, is obtained in each segmentation region, the similarity $s_{color}(r_i, r_j)$ between the regions is calculated by a formula:

$$s_{color}(r_i, r_j) = \sum_{k=1}^{n} \min(c_i^k, c_j^k), \quad (4)$$

$$c_i^k \in C_i = \{c_i^1, \ldots, c_i^n\}, c_j^k \in C_j = \{c_j^1, \ldots, c_j^n\}$$

The histogram needs to be recalculated for new regions in the region combination process through the simplified algorithm of the formula (5):

$$C_t = \frac{\text{size}(r_i) \times C_i + \text{size}(r_j) \times C_j}{\text{size}(r_i) + \text{size}(r_j)} \quad (5)$$

size($r_i$) denotes the size of the region $r_i$, size($r_j$) denotes the size of the region $r_j$, $C_i$ and $C_j$ denote the color vectors of the regions $r_i$ and $r_j$, $C_t$ and refers to the color vector of a new region.

(2) Texture Similarity

In order to reduce the amount of calculation, HOG feature is adopted in the invention in replace of SIFT feature to describe the region texture. Gradient feature is counted through a gradient histogram of 8 regions in the invention, 10 spaces are acquired in each color channel of the region, i.e., a 8*3*10 vector quantity $T_i=\{t_i^1, \ldots, t_i^n\}$ is obtained in each region, then a calculation formula of the Texture similarity $s_{texture}(r_i, r_j)$ between the regions is:

$$s_{texture}(r_i, r_j) = \sum_{k=1}^{n} \min(t_i^k, t_j^k), \quad (6)$$

$$t_i^k \in T_i = \{c_i^1, \ldots, c_i^n\}, t_j^k \in T_j = \{c_j^1, \ldots, c_j^n\}$$

(3) Size Similarity

When the Color similarity and the Texture similarity between two adjacent regions are the same, it shall be ensured that the regions having smaller areas are combined first, i.e., the regions having larger Size similarity are combined first, and the Size similarity is $s_{size}(r_i, r_j)$ is therefore defined in the invention as:

$$s_{size}(r_i, r_j) = 1 - \frac{size(r_i) + size(r_j)}{size(im)} \quad (7)$$

In the above formula, size(im) denotes the size of the entire image obtained after all regions are completely combined.

(4) Fill Similarity

In order to reduce the amount of calculations, the regions having a crossing or inclusion relation are first combined in the invention, and the Fill similarity fill$(r_i, r_j)$ is defined as:

$$\text{fill}(r_i, r_j) = 1 - \frac{size(BB_{ij}) - size(r_i) - size(r_j)}{size(im)} \quad (8)$$

wherein, size$(BB_{ij})$ denotes the size of the outer boundary rectangle of the region combined by the region $r_i$ and the region $r_j$.

The above four similarities are combined in a way of weighted summation to obtain a comprehensive similarity between the adjacent regions.

$$s(r_i, r_j) = a_1 s_{color} + a_2 s_{texture} + a_3 s_{size} + a_4 \text{fill} \quad (9)$$

The initial target regions are combined through the formulas (4) to (9). In this way, not only the different sizes can be adapted, but also the segmentation accuracy of the target can be ensured.

(V) Judgement of Vehicle Logo and Recognition of Vehicle Logo Type

With the Selective Search, only the target regions can be positioned, it cannot be determined that whether a region positioned is the vehicle logo region. Therefore, according to the invention, the Spatial Pyramid Matching based on Sparse Coding (ScSPM) is used to train the vehicle logo location classifier to determine the vehicle logo from the set of target regions as well as to train the vehicle logo recognition classifier to recognize the specific type of the vehicle logo.

The ScSPM is a more mature classifier training algorithm, in which firstly SIFT (Scale Invariant Feature Transform) is used to extract the feature of the target image, and then a pre-generated dictionary and linear encoding is used to encode the target image, so as to construct a reasonable image semantic expression model to express each image, and then a spatial pyramid matching method is used to get the final expression vector of the image, and finally the final expression vector of each image is fed into a Support Vector Machine (SVM) for training and recognition. The algorithm can be used for effectively training the vehicle logo location classifier and the vehicle logo recognition classifier.

Figure 6:
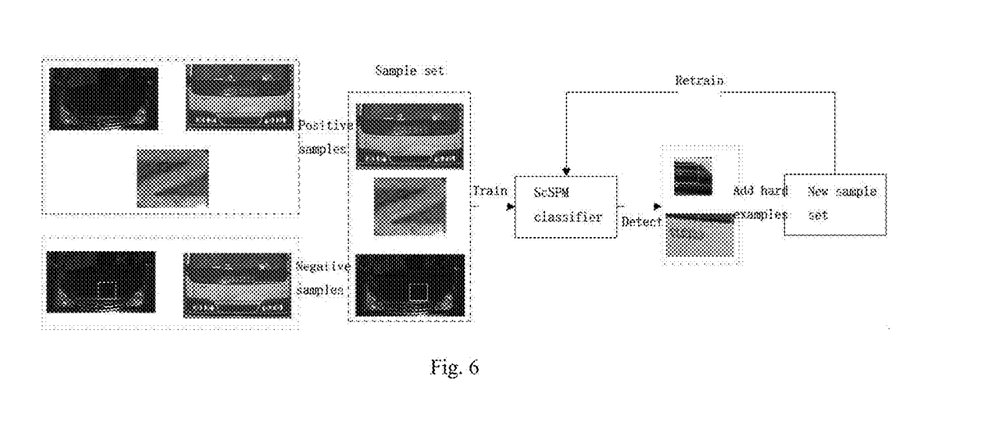
FIG. 6 is a schematic diagram of a training process of a vehicle logo judgment classifier.

Wherein, a training process of the vehicle logo location classifier is as shown in FIG. 6: the large vehicle and small vehicle in a sample set are taken as positive samples; in addition, single characters are added as positive samples, and negative samples are samples having intersection over union (IoU) less than 20% with the vehicle logo and randomly selected in size as all characters in a character string vehicle logo are easy to be dispersedly positioned; and then the positive samples are taken as training samples, the negative samples are taken as test samples, and the vehicle logo location classifier is trained using the ScSPM. With the vehicle logo location classifier, in a way of iteration training, while each training is completed, the samples, which are wrongly divided into the negative samples in the vehicle logo location classifier, i.e. hard examples, are added into the training samples, and then trained using the ScSPM again until convergence. By means of the above process, in the invention the vehicle logo location classifier is obtained by training, and the vehicle logo can be determined according to the vehicle logo location classifier. While a plurality of vehicle logos are detected for a vehicle, in the invention the vehicle logo location classifier can be used to score each of the vehicle logos, and consequently to provide target vehicle logo positioning results according to the scores.

But for a part of the character string vehicle logos, due to large gaps between characters, a character string cannot be positioned completely, and only a single character in the character string can be positioned, so that the type of the vehicle logo cannot be recognized. Directed to this problem, according to the invention the ScSPM is used to train a multi-class vehicle logo recognition classifier, as shown in FIG. 7.

Figure 7:
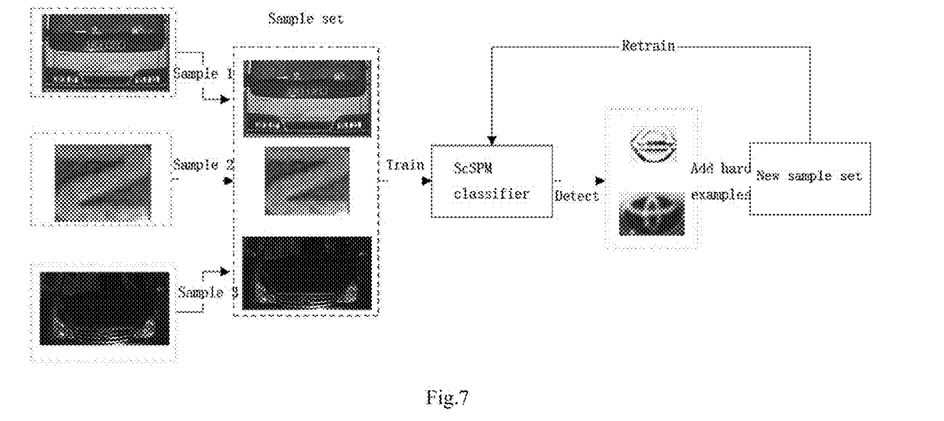
FIG. 7 is a schematic diagram of a training process of a multi-class vehicle logo recognition classifier.
Figure 8:
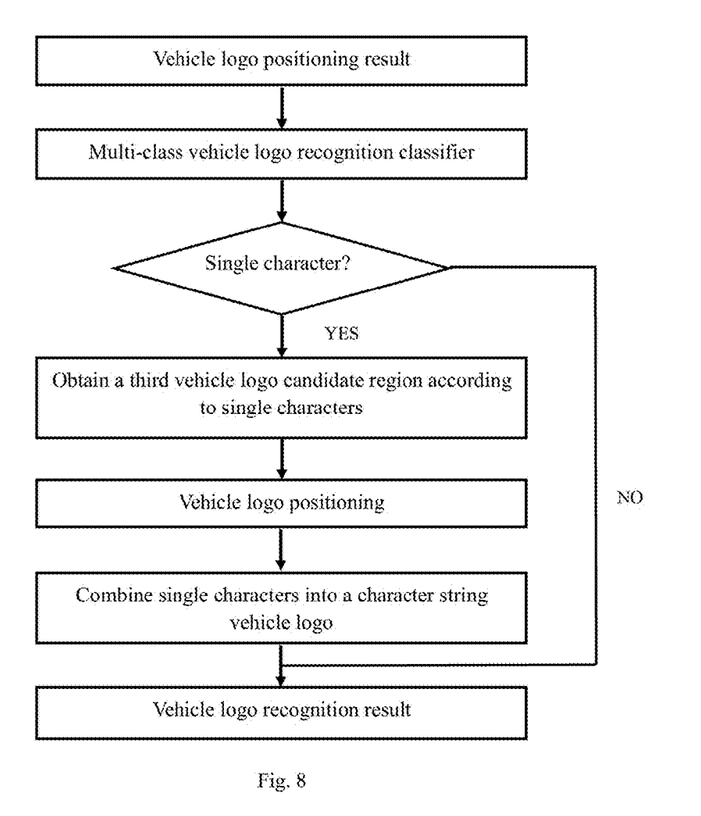
FIG. 8 is a chart diagram of a vehicle logo recognition process according to the invention.

As shown in FIG. 7, single characters are taken as the vehicle logo in training when the multi-class vehicle logo recognition classifier is adopted, and as the total characters are relatively few, the recognition effect of the classifier will not be affected. In the invention, the single characters of the manually annotated vehicle logo and the character string vehicle logo are fed into the ScSPM to perform training iteratively, and the wrongly-classified vehicle logos as the hard examples ae fed into the ScSPM again for training until convergence. Due to the nature of the ScSPM, basically, training iterations of three times can achieve convergence. A specific vehicle logo recognition process of the invention is as shown in FIG. 8: if a vehicle logo recognition result of the multi-class vehicle logo recognition classifier is a vehicle logo of a kind of non-single-character, the vehicle logo of the vehicle can be determined according to the recognition result; if the vehicle logo recognition result of the multi-class vehicle logo recognition classifier is a single character, the third vehicle logo candidate area 3 needs to be reselected according to the character, and the vehicle logo is repositioned, and the characters obtained by repositioning are combined to form a character string, so as to obtain a final vehicle logo recognition result.

The present invention provides a novel vehicle logo detecting and recognizing method based on Selective Search, and consequently has the following advantages.

1) It is applicable to all types of vehicle models and is not limited by the vehicle models, and large or small vehicles can be positioned.

2) The Selective Search is performed by the texture, color, size and fitness features of the vehicle logo, so that the position of the vehicle logo can be positioned correctly.

3) The vehicle logo location classifier and the vehicle logo recognition classifier are trained using the excellent feature of the Spatial Pyramid Matching based on Sparse Coding, which covers the vast majority of vehicle logo types, and can more accurately and effectively position and recognize the vehicle logo.

4) The vehicle logo candidate area is selected according to the space position information and the central axis of the vehicle, which greatly reduces the time consumption of the Selective Search, has a faster detection speed, so that the requirement for the real-time capability of positioning the vehicle logo is satisfied.

5) A new Texture similarity calculating method is defined, and the gradient histogram is used to replace the scale invariant transformation feature, which can greatly reduce the time consumption while ensuring the positioning accuracy rate and recognition accuracy rate of the vehicle logo.

6) The computational complexity is far lower than the existing vehicle logo detection and recognition technology, which is a high-speed and effective vehicle logo accurate positioning and identification scheme.

The above is the specific description for the preferred embodiment of the present invention, but the prevent invention is not intended to limit the foregoing embodiments. Various identical transformations or replacements can further be made by those skilled in the art without departing from the spirit of the invention shall all fall within the scope limited by the claims.

We claim:

1. A method of detecting and recognizing a vehicle logo based on Selective Search, comprising the steps of:
   positioning a license plate on an original image of a vehicle to obtain a license plate position;
   coarsely positioning a vehicle logo on the original image of the vehicle according to the license plate position, spatial structure between the license plate and the vehicle logo, and vehicle window edge feature, to obtain a coarse positioning image of the vehicle logo;
   selecting vehicle logo candidate areas in the coarse positioning image of the vehicle logo based on a central axis of the vehicle;
   performing target positioning on the vehicle logo candidate areas with a Selective Search, to obtain a set of target regions, wherein region combination performed with the Selective Search is based on color similarity, texture similarity, size similarity and fill similarity comprehensively;
   training a vehicle logo location classifier with Spatial Pyramid Matching based on Sparse Coding (ScSPM), to determine the vehicle logo from the set of target regions, to obtain a vehicle logo position; and
   training a multi-class vehicle logo recognition classifier with the Spatial Pyramid Matching based on Sparse Coding (ScSPM) to conduct specific type-recognition for the vehicle logo, to obtain a vehicle logo recognition result;
   determining a position of a down boundary for vehicle logo coarse positioning according to a position of an up boundary for vehicle logo coarse positioning, wherein the coordinate of the down boundary, $Y_{down}$, is determined by a formula $Y_{down} = y_{up}$, and $y_{up}$ refers to the coordinate of the up boundary;
   coarsely positioning a vehicle window according to vertical projection of the original image of the vehicle, to obtain the vehicle window edge feature, and determining a position of the up boundary according to the vehicle window edge feature, the coordinate $Y_{up}$ of the up boundary being determined by a formula:

$$\begin{cases} Y_{up} = x_2 - (x_2 - x_1)/2 \\ x_1, x_2 = \max_2 h(x) \\ \text{s.t. } |x_1 - x_2| \in [H/4, H/2], x_1 \in (0, H/3], |h(x_1) - h(x_2)| \le b \end{cases},$$

wherein, $h(x)$ refers to the vertical projection of the original image of the vehicle, $\max_2 h(x)$ denotes x-coordinates $x_1$ and $x_2$ corresponding to two maximum values $h(x_1)$ and $h(x_2)$ selected from the vertical projection $h(x)$ of the edge from up to down, H refers to a height of the original image of the vehicle, and b refers to an experience threshold value; and
   obtaining the coarse positioning image of the vehicle logo according to the coordinate $Y_{down}$ of down boundary and the coordinate $Y_{up}$ of the up boundary.

2. The method of claim 1, wherein the step of selecting vehicle logo candidate areas further comprises the steps of:
   determining the central axis of the vehicle on the coarse positioning image of the vehicle logo; and
   selecting an area having a set width and a set height as a first vehicle logo candidate area according to the central axis of the vehicle.

3. The method of claim 2, wherein the step of performing target positioning further comprises the steps of:
   performing target detection in the first vehicle logo candidate area using the Selective Search; and
   determining if the target detected is a single character or a character string logo or a symbol logo.

4. The method of claim 3, wherein the step of performing target positioning further comprises the step of transversely amplifying the first vehicle logo candidate area with a transversely amplified width set to form a second vehicle logo candidate area, and then performing target detection for vehicle logo in the second vehicle logo candidate area using the Selective Search.

5. The method of claim 4, wherein the step of performing target positioning further comprises the step of abandoning the first vehicle logo candidate area and continuing to amplify the second vehicle logo candidate area with a new transversely amplified width, until a target is detected in the second vehicle logo candidate area.

6. The method of claim 3, wherein the step of performing target positioning further comprises the step of ending the Selective Search if the target detected is at least one of the character string logo or the symbol logo.

7. The method of claim 3, wherein the step of performing target positioning further comprises the steps of:
   taking 1.5 times of the character height as a height of a candidate region, wherein the height of the candidate region is a height of a third vehicle logo candidate area, if the target detected is the single character; and
   continuing to perform target detection in the third vehicle logo candidate area using the selectivity search.

8. The method of claim 1, wherein the step of performing target positioning further comprises the steps of:

obtaining initial target regions from the vehicle logo candidate areas using an image segmentation algorithm based on a graph theory;

calculating similarity between the adjacent regions in the initial target regions obtained, via a calculation formula:

$$\begin{cases} s(r_i, r_j) = \\ a_1 s_{color}(r_i, r_j) + a_2 s_{texture}(r_i, r_j) + a_3 s_{size}(r_i, r_j) + a_4 \text{fill}(r_i, r_j) \\ s_{color}(r_i, r_j) = \\ \sum_{k=1}^{n} \min(c_i^k, c_j^k), c_i^k \in C_i = \{c_i^1, \ldots, c_i^n\}, c_j^k \in C_j = \{c_j^1, \ldots, c_j^n\} \\ s_{texture}(r_i, r_j) = \\ \sum_{k=1}^{n} \min(t_i^k, t_j^k), t_i^k \in T_i = \{c_i^1, \ldots, c_i^n\}, t_j^k \in T_j = \{c_j^1, \ldots, c_j^n\} \\ s_{size}(r_i, r_j) = 1 - \frac{\text{size}(r_i) + \text{size}(r_j)}{\text{size}(im)} \\ \text{fill}(r_i, r_j) = 1 - \frac{\text{size}(BB_{ij}) - \text{size}(r_i) - \text{size}(r_j)}{\text{size}(im)} \end{cases};$$

wherein $s(r_i, r_j)$, $s_{color}(r_i, r_j)$, $s_{texture}(r_i, r_j)$, $s_{size}(r_i, r_j)$ and fill$(r_i, r_j)$ refer to comprehensive similarity, color similarity, texture similarity, size similarity and fill similarity respectively between a region $r_i$ and a region $r_j$, $a_1$, $a_2$, $a_3$ and $a_4$ refer to a color similarity weighting coefficient, a texture similarity weighting coefficient, a size similarity weighting coefficient and a fill similarity weighting coefficient respectively, the value range of $a_1$, $a_2$, $a_3$ and $a_4$ is within (0,1), $C_i = \{c_i^1, \ldots, c_i^n\}$ and $C_j = \{c_j^1, \ldots, c_j^n\}$ refer to 3×25-dimensional color space vectors corresponding to the region $r_i$ and the region $r_j$ respectively, $T_i = \{t_i^1, \ldots, t_i^n\}$ and $T_j = \{t_j^1, \ldots, t_j^n\}$ refer to 8×3×10-dimensional texture vector corresponding to the region $r_i$ and the region $r_j$ respectively, n refers to the total number of elements of the color space vector or texture vector, and size$(r_i)$, size$(r_j)$, size$(im)$ and size$(BB_{ij})$ refer to size of the region $r_i$, size of the region $r_j$, size of the whole image combined by all the regions, and size of an outer boundary rectangle of a region combined by the region $r_i$ and the region $r_j$, respectively; and taking the comprehensive similarity maximum as a combination principle, combining the initial target regions according to the comprehensive similarity calculated between the adjacent regions, to obtain the set of target regions.

9. The method according to claim 1, wherein the step of training a vehicle logo location classifier further comprises the steps of:

dividing sample images into positive samples and negative samples, wherein the positive samples comprises single character samples, and small-vehicle logo samples and large-vehicle logo samples in the sample set, and the negative samples are samples having intersection over union (IoU) 20% less than ground truth and having random sizes;

taking the positive samples as training samples, and using Spatial Pyramid Matching based on Sparse Coding (ScSPM) to perform training iteratively until convergence, and finally to have the vehicle logo location classifier, wherein, in the iterative training process, after each training, the samples which are wrongly detected into the negative samples in the vehicle logo location classifier is added into the training samples to form a new training sample set, then the new training sample set is used for retraining; and determining the vehicle logo from the set of target regions according to the vehicle logo location classified trained, to obtain the position of the vehicle logo.

10. The method according to claim 3, wherein the step of training a multi-class vehicle logo recognition classifier further comprises the steps of:

taking single characters as vehicle logos, feeding the single characters of manually annotated vehicle logos and the character string vehicle logos into the Spatial Pyramid Matching based on Sparse Coding (ScSPM) to perform training iteratively;

taking the wrongly-classified vehicle logos as hard examples and feeding them into the Spatial Pyramid Matching based on Sparse Coding (ScSPM) for training until convergence, to obtain the multi-class vehicle logo recognition classifier; and performing specific type-recognition for the vehicle logo with the multi-class vehicle logo recognition classifier by taking the result as the vehicle logo type, if the vehicle logo recognition result is a letter logo or symbol;

combining the characters obtained by positioning to form the letter logo; and recognizing the letter logo.

11. The method according to claim 3, wherein the step of training a multi-class vehicle logo recognition classifier further comprises the steps of:

taking single characters as vehicle logos, feeding the single characters of manually annotated vehicle logos and the character string vehicle logos into the Spatial Pyramid Matching based on Sparse Coding (ScSPM) to perform training iteratively, and taking the wrongly-classified vehicle logos as hard examples and feeding them into the Spatial Pyramid Matching based on Sparse Coding (ScSPM) for training until convergence, to obtain the multi-class vehicle logo recognition classifier; and performing specific type-recognition for the vehicle logo with the multi-class vehicle logo recognition classifier by detecting the vehicle logo in a third candidate area, if the vehicle logo recognition result is a single character;

combining the characters obtained by positioning to form the letter logo; and recognizing the letter logo.

* * * * *